United States Patent [19]

Furuse et al.

[11] Patent Number: 4,992,038
[45] Date of Patent: Feb. 12, 1991

[54] MOLDING MACHINE FOR AN ORIENTED AND BLOWN HOLLOW CONTAINER WITH A LABEL

[75] Inventors: Tatsuo Furuse; Keiji Kazato; Katsuyuki Ohno; Katsuhiko Kimura, all of Tokyo; Yoshinori Nakamura, Sakakimachi; Katsumi Noda, Kyoto, all of Japan

[73] Assignees: Toppan Printing Co., Ltd.; Nissei ASB Machine Co., Ltd.; Yusin Precision Equipment Co., all of Japan

[21] Appl. No.: 304,848
[22] PCT Filed: May 30, 1988
[86] PCT No.: PCT/JP88/00531
  § 371 Date: Jan. 23, 1989
  § 102(e) Date: Jan. 23, 1989
[87] PCT Pub. No.: WO88/09259
  PCT Pub. Date: Dec. 1, 1988

[30] Foreign Application Priority Data

May 29, 1987 [JP] Japan .................. 62-136017

[51] Int. Cl.$^5$ ............................................. B29C 49/24
[52] U.S. Cl. ................................. 425/503; 425/522; 425/537; 425/540
[58] Field of Search ............... 425/503, 504, 522, 537, 425/540; 264/509, 538, 543

[56] References Cited

U.S. PATENT DOCUMENTS

| | | | |
|---|---|---|---|
| 3,292,209 | 12/1966 | Borkmann | 425/522 X |
| 4,397,625 | 8/1983 | Hellmer et al. | 425/522 X |
| 4,479,770 | 10/1984 | Slat et al. | 425/503 |
| 4,479,771 | 10/1984 | Slat et al. | 425/503 |
| 4,563,148 | 1/1986 | Hasl et al. | 425/503 |
| 4,616,992 | 10/1986 | Oles | 425/504 X |
| 4,636,166 | 1/1987 | Franks et al. | 425/504 X |
| 4,639,206 | 1/1987 | Darr | 425/504 X |
| 4,679,997 | 7/1987 | Plenzler et al. | 425/503 X |
| 4,721,451 | 1/1988 | Darr | 425/503 |
| 4,737,098 | 4/1988 | Oles et al. | 425/503 |

FOREIGN PATENT DOCUMENTS

| | | | |
|---|---|---|---|
| 82967 | 7/1977 | Japan . | |
| 22096 | 7/1978 | Japan . | |
| 91034 | 5/1984 | Japan | 264/509 |
| 114033 | 6/1984 | Japan . | |
| 237620 | 10/1986 | Japan . | |

Primary Examiner—Richard L. Chiesa
Attorney, Agent, or Firm—Lerner, David, Littenberg, Krumholz & Mentlik

[57] ABSTRACT

A molding machine is provided comprising a rotary type molding machine (1) having an injection molding portion (3) for molding a preform, an orientation blow molding portion (5) provided with a blow mold (13) which receives the preform directly or after being subjected to temperature control for molding the preform into a hollow container such as a bottle by means of an orientation blow device and, a molded product removing portion (6), and a label insertion device (20) provided adjacent the orientation blow molding portion (5). The label insertion device (20) comprises a label supply device (26) positioned to the side of the blow mold, a drive device for moving the label supply device (26) forward and backward with respect to the blow mold, and a label magazine (42) disposed between the label supply device (26) and the orientation blow molding portion (5).

7 Claims, 4 Drawing Sheets

MOLDING MACHINE FOR AN ORIENTED AND BLOWN HOLLOW CONTAINER WITH A LABEL

FIELD OF THE INVENTION

This invention relates to a molding machine for continuously carrying out operations including molding of an oriented and blown hollow container, pasting of a label to a container body, and further removing a molded product.

BACKGROUND OF THE INVENTION

A molding machine has been well known from Japanese Patent Publication No. 53-22,096 Specification in which an intermittently rotating transfer plate is provided above a machine frame, and various operating portions including a preform molding portion, a temperature control portion, an orientation blow molding portion and a molded product removing portion are set at every stop position of a retaining mold provided on the underside of the transfer plate to continuously carry out operations from injection molding of a preform to orientation blow molding of a hollow molded product.

In such a molding machine as described, in the case where a label is pasted to a body portion of a molded product, it is preferred that a label dispenser is disposed in the orientation blow molding portion, and such pasting is effected simultaneously with the orientation blow molding of a hollow molded product. However, label insertion devices so far developed have been designed for use with a normal blow molding machine, and such label insertion devices have been difficult to use for the above-described rotary type orientation blow molding machine.

For example, a label dispenser within a mold described in Japanese Patent Application Laid-Open No. 56-237620 Publication comprises a base, at least one label magazine mounted to the base adjacent to the mold, a label feed mechanism including a sub-base movably mounted on the base, a first actuator for moving the sub-base between a registration position with respect to an open mold position and a feed position, a shuttle which is moved together with the sub-base by the force of the first actuator and mounted movably with respect to the sub-base so as to move toward and away from the mold, at least one label carrier mounted on the shuttle in the state wherein the carrier is fixed to the shuttle to carry a mold label from the label magazine, and a second carrier which is mounted movably on the sub-base and connected to the shuttle so as to move the shuttle within the subtraction position and insertion position with respect to the mold.

In such a dispenser as described above, it is necessary to extend a part of the base to the underside of a blow mold and to reciprocate a label carrier together with the shuttle while being guided by a support provided on the base. Therefore, this dispenser cannot be used for an orientation blow molding machine which cannot form a space under the blow mold without modification. In addition, the first actuator for moving the sub-base between the registration position with respect to a cavity portion of the blow mold and the feed position, and the second actuator which is mounted movably on the sub-base and connected to the shuttle to move the shuttle between the subtraction position with respect to the mold and the insertion position are required to cooperate such that these two actuators feed a label to the required mold surface of the cavity. Therefore, a further problem is that the apparatus and the step of supply become complicated, and the aforesaid dispenser cannot be used for the rotary type orientation blow molding machine unless these problems are solved.

SUMMARY OF THE INVENTION

This invention is intended to solve the above-described problem. It is an object of this invention to provide a molding machine for an oriented and blown hollow container with a label, which is provided with a label insertion device which can always supply a label to a required position of a blow cavity positively with a simple step, which is easy in locating and which can be easily applied even to a rotary type orientation blow molding machine.

It is a further object of this invention to provide a molding machine for an oriented and blown hollow container with a label, which is provided with a labelling device which is free from any inconvenience in carrying removed molded products even if the orientation blow molding portion and molded product removing portion are positioned adjacent to each other.

It is another object of this invention to provide a molding machine for an oriented and blown hollow container with a label, which is provided with a label insertion device which can alternately carry out both label insertion and removal of a molded product on one and the same machine frame.

The above-described objects are achieved by this invention which provides a molding machine for an orientation blow molding of a hollow container such as a bottle, in which when the aforesaid blow mold is opened prior to transportion of a preform, a label holder of a label supply device is inserted into a cavity from the side of a mold to stick a label to the side surface of the cavity, after which the preform is transported to the blow mold and the mold is closed, and thereafter, orientation blow molding is carried out to simultaneously effect both molding of a hollow container and affixing of a label. The molding machine comprises an injection molding portion for molding a preform having a required shape, an orientation blow molding portion provided with a blow mold which receives said preform directly or after being subjected to temperature control for molding the preform into a hollow container such as a bottle by means of an orientation blow device, a molded product removing portion, means for successively transporting said preform and molded products, and a label insertion device provided in said orientation blow molding portion, said label insertion device comprising a label supply device positioned to the side of said blow mold, a drive device for moving said label supply device forward and backward with respect to the blow mold, and a label magazine disposed in front of the label supply device.

In the molding machine having the above-described construction, a preform is injection molded in the preform molding portion, and the preform is transported to the orientation blow molding portion after having been temperature controlled in the temperature control portion. A label is inserted into the cavity surface of the mold before the preform is set to the blow mold, and the label is affixed to the body portion of the molded hollow product simultaneously with the orientation blow molding of the preform inserted into the blow mold.

During the molding, the label supply device of the label insertion device is moved backward by the drive device and stands by to the side of the mold. When the orientation blow molding labelling are completed and the mold is opened and the molded product is transported from the blow mold to the removal operating portion. The label supply device then is moved forward by the drive device to attract labels one by one away from the label magazine, and further moved forward until the label reaches a predetermined position and stops. After stopping, the label is brought into contact with the interior of the cavity surface of the blow mold which is provided with an attraction means for attracting the label, after which the label supply device is moved backward and stands by to the side of the mold. During the standby, the molded product removed outside the machine by the removal operating portion is moved under the label supply device by a conveyor and is delivered.

BRIEF DESCRIPTION OF THE DRAWINGS

The drawings are schematic illustrations of a molding machine for an oriented and blown hollow container with a label.

DESCRIPTION OF THE PREFERRED EMBODIMENTS OF THE INVENTION

Figure 1:
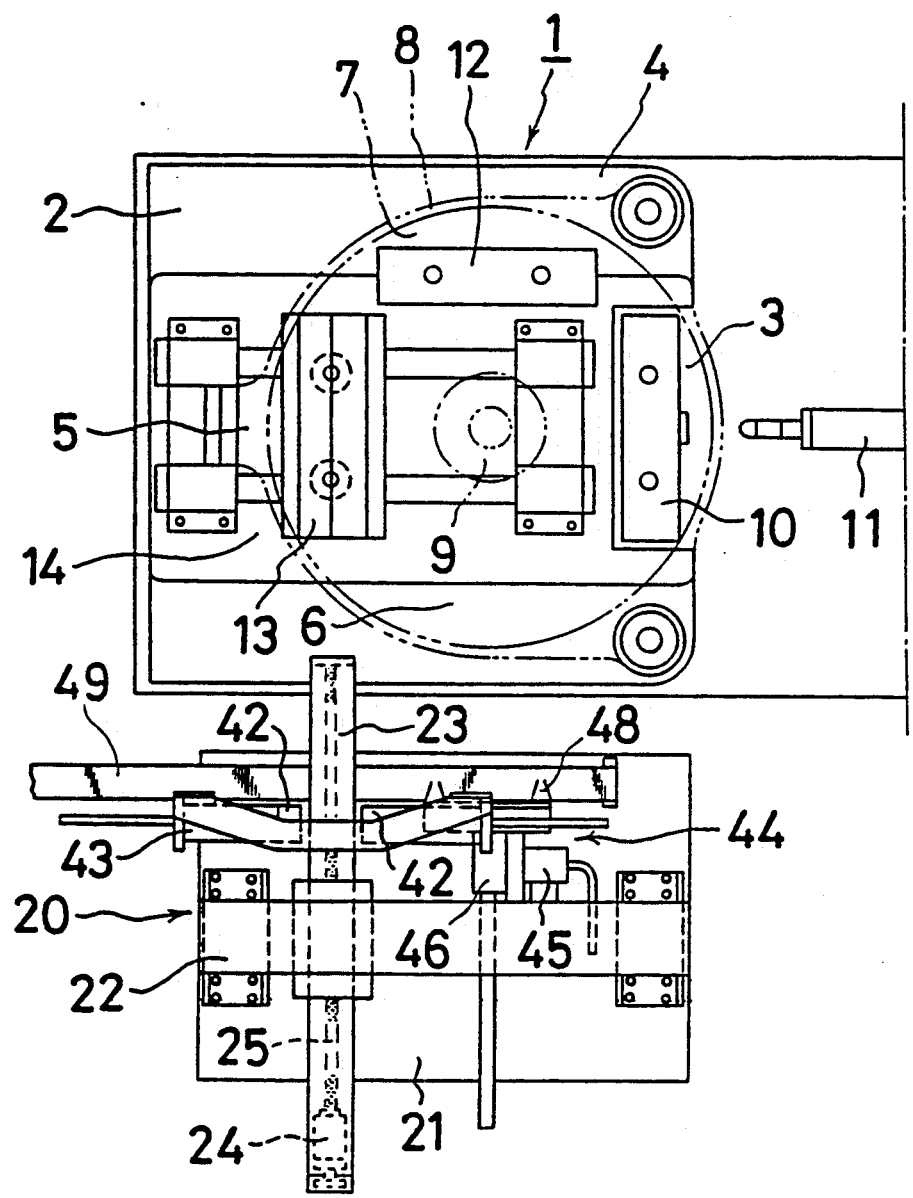
FIG. 1 is a plan view of a lower portion.

In the drawings, reference numeral 1 designates an injection orientation blow molding apparatus. Around machine frame 2 are various operating portions including a preform molding portion 3, a temperature control portion 4, an orientation blow molding portion 5 and a molded product removing portion 6. An upper base plate 8 having a transfer plate 7 provided underside thereof is located above the operating portions, and neck molds and retaining molds in the same number as that of the operating portions are mounted on the undersurface of the transfer plate.

The transfer plate 7 intermittently rotates while repeating stops every 90 degrees by means of a hydraulically or electrically-operated driving device 9 installed in the central portion of the upper base plate 8, and when the transfer plate 7 stops, work is carried out in each operating portion.

In the preform molding portion 3, an injection mold 10 closed with the retaining mold and an injection device 11 and a vertical clamping device (not shown) are provided, and a temperature control mold 12 is disposed in the temperature control portion 4. In the orientation blow molding portion 5, a blow mold 13 slidably moved on a lower base plate 14 in a radial direction, to be opened and closed, and an orientation blowing device 15 installed on the upper base plate 8 are provided. In the molded product removing portion 6, a retaining-mold opening device not shown is provided.

Reference numeral 20 designates a label insertion device which is disposed on the side of the orientation blow molding portion. This label insertion device 20 is mounted on a horizontal guide member and receiving beam 23 above a gate-type frame 22 stood upright on a bed 21. A transporting threaded shaft 25 rotated by means of a servo-motor 24 is rotatably mounted on the underside of the receiving beam 23. The threaded shaft 25 and servo-motor 24 function as a drive device for moving a label supply device, described later, forward and backward with respect to the blow mold 13.

A support 27 of the label supply device 26 is vertically suspended from the receiving beam 23. This support 27 is composed of a base portion 29 at the upper end with a nut member secured therein, a guide frame 30 vertically provided internally of the base portion and a side plate 31. The support 27 is suspended movably in a horizontal direction with the nut member 28 engaged with the threaded shaft 25 and with the base portion 29 fitted into a guide groove on the side of the receiving beam 23.

The label supply device 26 is mounted movably up and down on the guide frame 30 of the support 27 and is connected to a piston rod 33 of an elevating air cylinder 32 provided at the lower portion of the support 27. The downward movement of the label supply device 26 caused by the air cylinder 32 is restricted by a stopper member 34 of a threaded shaft provided at the lower part of the guide frame 30, and said restricted position can be taken as a label inserted position with respect to the blow mold 13.

A label is supplied to the cavity of the blow mold 13 by a label holder 35 comprising a pair of arms provided on the label supply device 26. This label holder 35 is movably provided on both sides of the body 36 with a rear end thereof threadedly engaged with threaded shafts 37 and 38 within the interior of body 35 which are different in thread lead to left and right. Label attraction members 39, 39 are provided at required intervals on the outer surface thereof. A motor 41 for rotating the threaded shafts 37 and 38 through a belt 40 is installed above the body 36.

Reference numeral 42 designates a label magazine disposed above the extreme end of the arm 35, and a label 42a is always pressed by means of an air cylinder 43.

Reference numeral 44 designates a molded product removing device provided on the bed 21 adjacent to the label insertion device 20 and comprises a horizontal air cylinder 46 provided movably up and down on the support 45 and a chuck 48 mounted to the extreme end of a piston rod 47.

Figure 6:
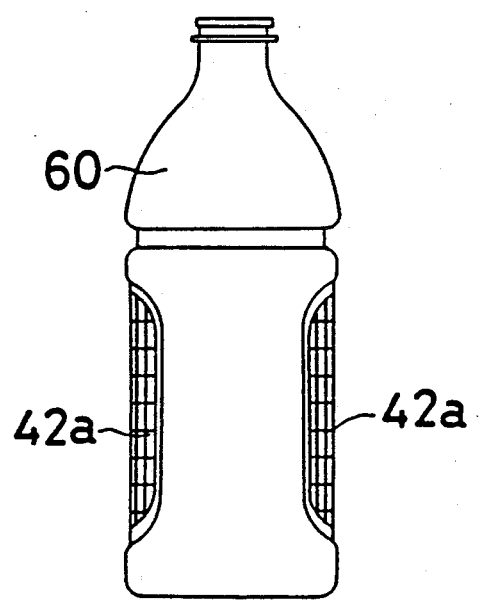
FIG. 6 is a side view of a molded product with a label.

Reference numeral 49 designates a conveyor for a molded product 60 (see FIG. 6), which is provided from the front of the molded product removing device 44 to the bed 21 on the side of the label supply device 26.

The operation of the label insertion device 20 will be described hereinafter.

Figure 4A:
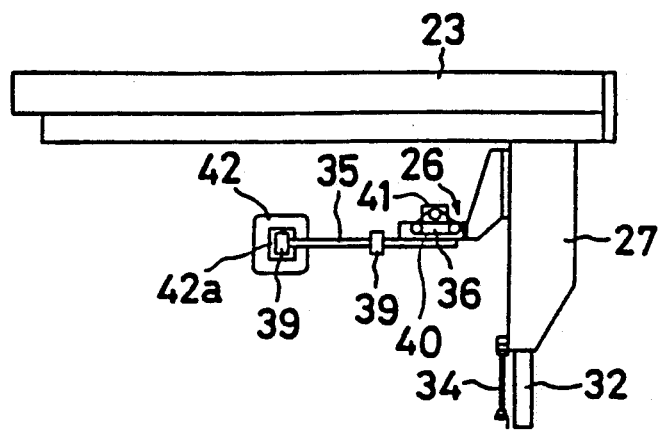
FIGS. 4, I, II and III, are respectively explanatory views of a label supply device.
Figure 4B:
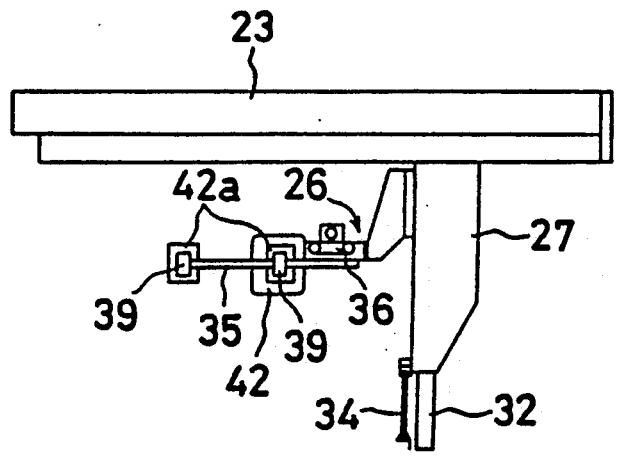
Figure 4C:
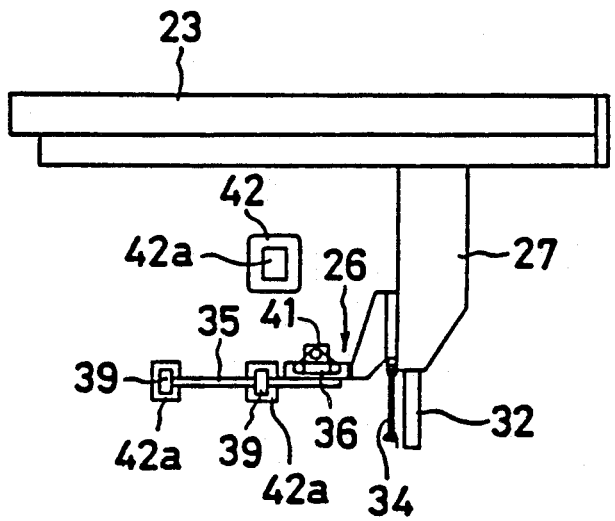

In the backward position shown in FIG. Z, when the air cylinder 32 is actuated to extend the piston rod 33, the label supply device 26 moves up to the position of the label magazine 42 along the guide frame 30 and the label attraction members 39 at the extreme end of the label holder 35 face the label magazine 42, as shown in FIG. 4 (I).

Subsequently, the motor 41 on the body 36 is actuated to rotate the threaded shafts 37 and 38, and the pair of label holders 35 are moved outwardly and the label attraction members 39 at the extreme end thereof come into pressure contact with the label 42a. After the pressure contact, the motor 41 is changed in the rotational direction to reverse the threaded shafts 37 and 38 and inwardly move back the label holder 35. Thereby, the label 42a is attracted by the label attraction member 39 and pulled out of the label magazine 42.

Thereafter, the servo-motor 24 is actuated to normally rotate the threaded shaft 25, and the support 27 moves forward so that the next label attraction member 39 reaches the position of the label magazine 42 as shown in FIG. 4(II). At this time, the operation of the servo-motor 24 is stopped, and the attraction and removal of the label 42a are again carried out in a manner similar to that as described above.

After the attraction of the label 42a has been completed in a manner as described above, the air cylinder 32 is actuated to contract the piston rod 33, and the label supply device 26 is moved down to the position at which the piston rod comes into contact with the stopper member 34, as shown in FIG. 4 (III), and stands by till the blow mold 13 opens.

The operations of the label insertion device 20 and molded product removing device 44 provided adjacent thereto are carried out to correspond to the operations of the various operating portions of the orientation blow molding apparatus 1. In the various operating portions, the injection molding of a preform, the temperature control, the orientation blow molding of a molded product, the removal thereof and so forth are simultaneously carried out at every stop of the transfer plate 7. At the same time, the above-described operations in the label insertion device 20 are carried out for preparation of the succeeding steps. When the blow mold 13 is completely opened, the servo-motor 24 is again actuated so that the label supply device 26 moves forward and the label holder 35 is inserted into the cavity of the blow mold 13 from the side of the mold.

The label holder 35 after being inserted stops at a predetermined cavity position by the stoppage of the servo-motor 24, and the label 42a faces to the label attraction position of the cavity. Similarly to the case of the label attraction described above, the motor 41 is actuated to rotate the threaded shafts 37 and 38, and the label holder 35 is moved outward to bring the label 42a pressure contact with the cavity surface, whereby the label is attracted to the cavity surface by the attraction means provided on the side of the blow mold.

After the label 42a has been inserted in the cavity, the motor 41 is reversed to return the label holder 35 to its original state, and the servo-motor 24 is reversed to move backward the label supply device 26 together with the support 27 onto the bed 21 for preparation of the succeeding step.

At the same time, on the blow mold side the preform is fed into the central portion of the cavity by the rotation of the transfer plate 7, and the mold is closed after the transfer plate 7 is stopped. The affixing of the label 42a is carried out simultaneously with the orientation blow molding of a hollow container. After the mold has been opened, a hollow container 60 with the label 42a affixed to the body thereof is transported to the molded product removing portion 6, and the container is then transferred onto the conveyer 49 from the retaining mold by the molded product removing device 44 and conveyed to the end of the conveyor passing under the label supply device 26 positioned upwardly, as shown in FIGS. 4 (I) and 4 (II).

Figure 5:
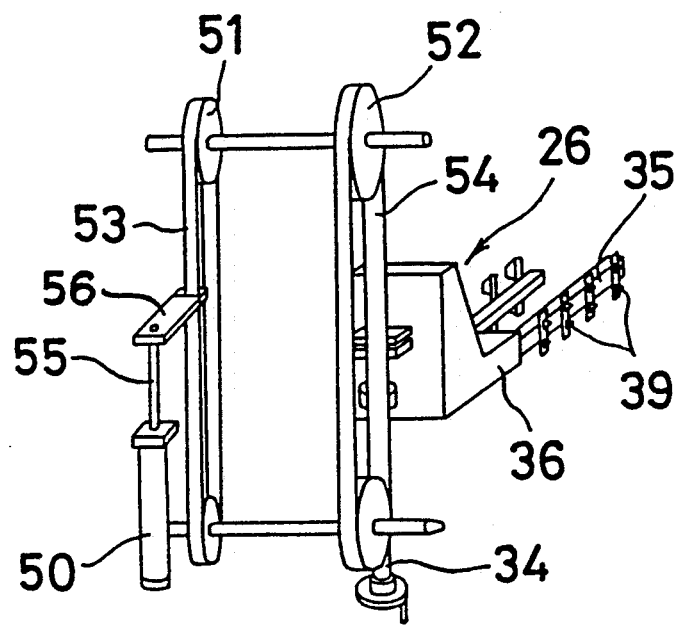
FIG. 5 is a perspective view of an elevating device in another embodiment.

FIG. 5 shows another embodiment for elevating label supply device 26, which comprises an air cylinder 50 having a short stroke, and a pair of belts 53 and 54 wound around coaxial pulleys 51 and 52 whose ratio is 1:2, wherein a piston rod 55 of the air cylinder 50 is connected through a member 56 to the belt 53 on the side of the small-diameter pulley 51, and the label supply device 26 is connected to the other belt 54.

In this elevating device, twice the stroke of twice the piston rod 55 is transmitted as the stroke to the label supply device 26 in terms of the pulley ratio.

INDUSTRIAL APPLICABILITY

In this invention, as mentioned above, a label is inserted from the side of a blow mold, and therefore, this invention can be applied to molding by an orientation blow molding apparatus in which an extra space is not available in upper and lower portions of the blow mold, to mold a hollow container with a label. In addition, the construction of the apparatus is simple and locating of the apparatus can be also easily accomplished. Labels can be always supplied positively. The apparatus of this invention is extremely effective in industry and can be extensively utilized.

We claim:

1. A molding apparatus for an oriented and blown hollow container with a label comprising:
   an injection molding portion for molding a preform;
   an orientation blow molding portion comprising a blow mold which receives said preform for molding said preform into a molded product by means of an orientation blow device, said blow mold having first and second side molds defining an internal cavity, said side molds opening and closing along a first substantially horizontal axis;
   a molded product removing portion;
   means for transporting said preform and molded products;
   a label supply device positioned to the side of said blow mold, said label supply device having a label holder moveably provided on both sides of a body with a rear end threadedly engaged with a threaded shaft within said body, said shaft having different thread lead to the left and to the right;
   a drive device for moving said label supply device between a first forward position and a second backward position with respect to the blow mold along a second substantially horizontal axis, said second axis substantially perpendicular to said first axis; and
   a label magazine disposed between said first and second positions.

2. A molding apparatus for an oriented and blown hollow container with a label comprising:
   an injection molding portion for molding a preform;
   an orientation blow molding portion comprising a blow mold which receives said preform for molding the preform into a molded product by means of an orientation blow device, said blow mold having first and second side molds defining an internal cavity, said side molds opening and closing along a first substantially horizontal axis;
   a molded product removing portion;
   means for transporting said preform and molded products;
   a label supply device positioned to the side of said blow mold moveably mounted on a guide frame of a support and connected to a piston rod of an elevating air cylinder, provided within the lower portion of the support, for moving said label supply device upwardly and downwardly on said guide frame;

a drive device for moving said label supply device between a first forward position and a second backward position with respect to the blow mold along a second substantially horizontal axis, said second axis substantially perpendicular to said first axis;

a label magazine disposed between said first and second positions; and distance-enhancing means to move said label supply device in response to a stroke of said elevating air cylinder a distance which is greater than said stroke, wherein said distance-enhancing means comprise a belt connected to said elevating air cylinder and wound around a small-diameter pulley of coaxial pulleys which are different in ratio.

3. In a rotary molding machine having a preform molding station, preform temperature controlling station, blow molding station, a product removing station, and a label supply and product removing apparatus, said apparatus comprising:

(a) a molded product removing device for removing molded products from said machine, said product removing device located adjacent said product removing station and comprising a horizontally disposed member for moving said product removing device forwardly and backwardly;

(b) a label magazine positioned above said member;

(c) a label supply device located adjacent said product removing station and to the side of said product removing device; and (d) means for moving said label supply device upwardly and downwardly for engaging labels in said label magazine and forwardly and backwardly for providing labels to said blow molding station.

4. An apparatus as in claim 3, wherein said label supply device is moveably mounted on a guide frame of a support and is connected to a piston rod of an elevating air cylinder, provided within the lower portion of the support, for moving said label supply device upwardly and downwardly on said guide frame.

5. An apparatus as in claim 3, wherein said label supply device has a label holder moveably provided on both sides of a body with a rear end threadedly engaged with a threaded shaft within said body, said shaft having different thread lead to the left and to the right.

6. An apparatus as in claim 4, further comprising distance-enhancing means to move said label supply device in response to a stroke of said elevating air cylinder a distance which is greater than said stroke.

7. An apparatus as in claim 6, wherein said distance-enhancing means comprise a belt connected to said elevating air cylinder and wound around a small-diameter pulley of coaxial pulleys which are different in ratio.

* * * * *

UNITED STATES PATENT AND TRADEMARK OFFICE
CERTIFICATE OF CORRECTION

PATENT NO. : 4,992,038

DATED : February 12, 1991

INVENTOR(S) : Furuse, et al.

Figure 2:
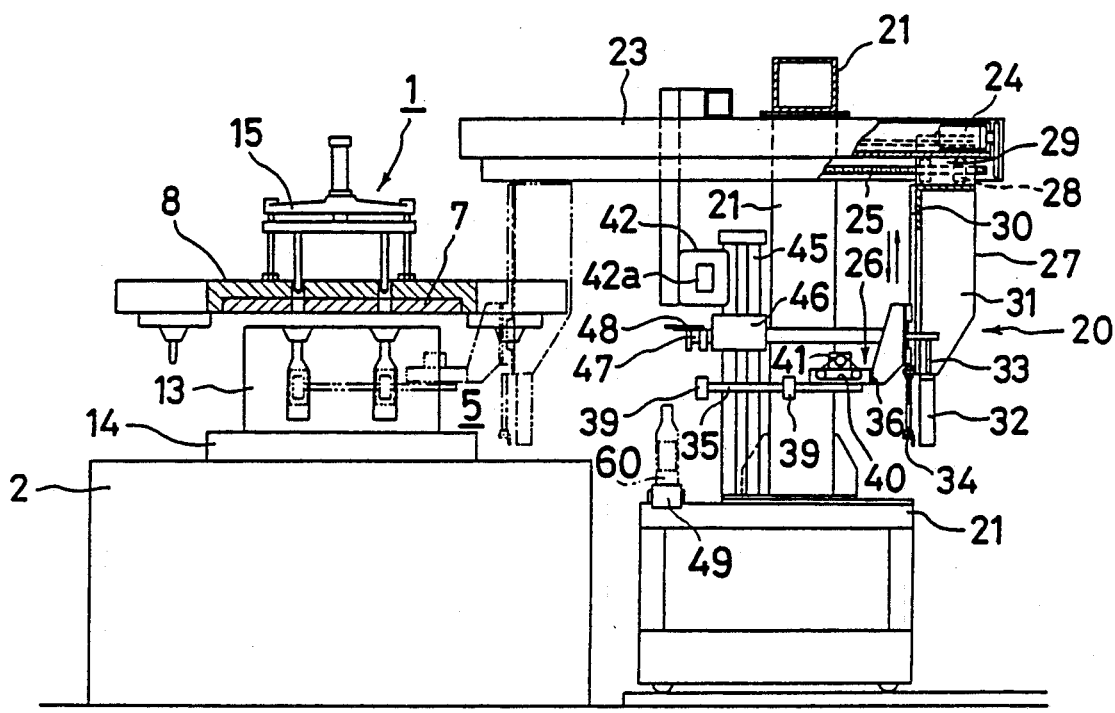
FIG. 2 is a longitudinal sectional view of an orientation blow molding portion and a label insertion device.
Figure 3:
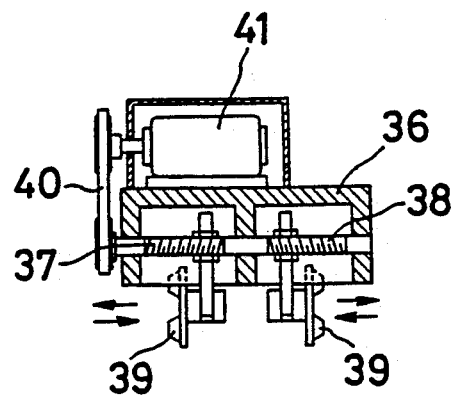
FIG. 3 is a longitudinal sectional view of a label supply device body.

It is certified that error appears in the above-identified patent and that said Letters Patent is hereby corrected as shown below:

On the title page:
In Inventors, line 4, "Kyoto" should read --Kyoto-shi--;
In abstract, line 8, cancel the word "and".
Column 3, line 2, after "molding" insert --and--.
Column 3, line 2, "completed and" should read --completed,--.
Column 4, line 55, "FIG. Z" should read --FIG. 2--.
Column 5, line 42, before "pressure" insert --into--.
column 6, line 5, cancel the second occurrence of the word "twice".

Signed and Sealed this

Eleventh Day of August, 1992

Attest:

DOUGLAS B. COMER

*Attesting Officer*  *Acting Commissioner of Patents and Trademarks*